No. 679,330. Patented July 30, 1901.
E. PETERSSON.
PROCESS OF EXTRACTING ARSENIC, ANTIMONY, OR TELLURIUM FROM SULFUROUS ORES.
(Application filed Mar. 23, 1900.)
(No Model.)
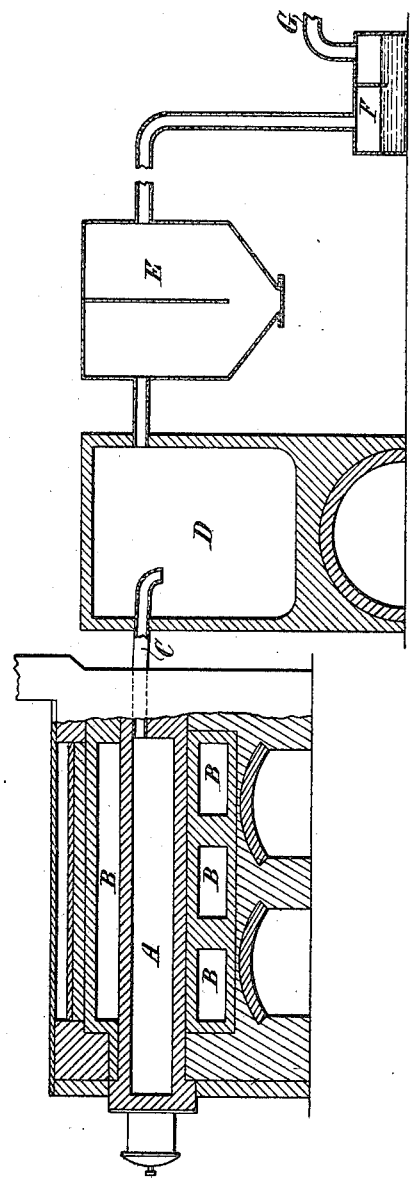

UNITED STATES PATENT OFFICE.

ELIAS PETERSSON, OF BRUSSELS, BELGIUM, ASSIGNOR, BY MESNE ASSIGNMENTS, TO THE INTRACTABLE ORE TREATMENT COMPANY, LIMITED, OF LONDON, ENGLAND.

PROCESS OF EXTRACTING ARSENIC, ANTIMONY, OR TELLURIUM FROM SULFUROUS ORES.

SPECIFICATION forming part of Letters Patent No. 679,330, dated July 30, 1901.

Application filed March 23, 1900. Serial No. 9,957. (No specimens.)

*To all whom it may concern:*

Be it known that I, ELIAS PETERSSON, mining engineer, a subject of the King of Sweden and Norway, residing at 32 Avenue de la Couronne, Brussels, in the Kingdom of Belgium, have invented an Improved Process of Extracting Arsenic, Antimony, or Tellurium from Sulfurous Ores Containing Them, of which the following is a specification.

In the specification accompanying my application filed December 30, 1898, Serial No. 700,759, a process is described for treating ores containing arsenic and antimony or tellurium in which the ores after being pulverized and admixed with pulverized carbonaceous matter were heated in a retort or muffle until the arsenic had been expelled and then the ores were afterward treated in other ways to remove the antimony and tellurium and other metals contained in them.

According to the present invention the process as described in the above specification is carried on until the arsenic has been expelled, and then the mixed powdered ore and carbonaceous material contained in the retort or muffle are submitted to a still higher heat sufficient to volatilize the antimony until the antimony and it may be also the bulk of the tellurium have also been driven off. The ore in a finely-pulverized state is mixed with carbon, also reduced to powder, and the mixture is heated in a muffle-furnace first to a temperature sufficiently high to volatilize or convert into vapor the arsenious and arsenic sulfids, and when this has been done the muffle is still further heated to a higher temperature to volatilize or convert into vapor the antimony in the form of antimonious sulfid. Preferably about ten per cent. of carbon, by weight, or it may conveniently be such an amount of sawdust (or other organic material capable of yielding carbon by calcination) as will on coking yield ten per cent. of carbon, is added to the ore; but the amount may be varied according to the nature of the ore, its oxygen contents, and its liability to melt.

Arsenic in the state of arsenious and arsenic sulfids is set free or vaporized at temperatures above 650° to 700° centigrade or higher, according to the nature of the ore and the composition of the arsenic-bearing minerals. If the temperature be raised still higher—*i. e.*, to a full red heat—antimony as antimonious sulfid is volatilized. Both these substances are condensed in suitable cooling apparatus or condensers either mixed or more or less separately by the use of separate condensers for the different ranges of temperature of the volatilized substances.

Tellurium will be more or less volatilized, according to the nature of telluride compound present. Possibly some tellurides, such as those of lead and bismuth, would not be decomposed unless subjected to very prolonged heating; but the tellurides of gold and silver would be completely decomposed if submitted to a temperature sufficient to volatilize sulfid of antimony during the period (some few hours) for which the mixture of carbon and pulverized ore is heated in the muffle, and the tellurium would pass off either as a metallic vapor or a vaporized compound containing some other component of the ore. The precious metals would therefore be left in a state in which they are then readily recoverable. In this way both antimony and arsenic and the bulk of the tellurium may be removed by volatilization, either together or separately, and the gold left in the final residues may then be extracted by any convenient means, such as by amalgamation, cyanidation, or chlorination. If any traces of arsenic, antimony, or tellurium remain behind after the volatilization process, they may (if found to hinder gold extraction) be removed by an acid wash of dilute sulfuric or hydrochloric acid or by a short oxidizing calcination followed by an acid wash. If gold recovery is to be effected by chlorination, such a secondary oxidizing calcination is necessary to remove the unburned carbon, which would interfere with the chlorinating operation and to a less degree with cyanidation. An oxidizing roast is also necessary before recovery of gold from the residues by chlorination or cyaniding, where the mineral originally treated contains other non-volatile metallic sulfids—such as iron, zinc, blande, &c.—which for all practical purposes remain unaltered when heated with carbon to a temperature sufficient to volatilize antimony sulfid, but require to be roasted to their respective oxids before submission to gold-recovery processes.

If the mineral which is being treated should contain small quantities of iron pyrites, some of the sulfur which it contains would be driven off and would combine with the arsenic or antimony contained in the ore and pass off with it.

The carbon in addition to preventing oxidation of the sulfurets (by any inlet leaks of air) also serves to insulate the particles of molten sulfids—e. g., galena, antimonious sulfid, &c.—and thus prevent the consequent clotting and clogging of the charge. This is most important in dealing with readily-fusible minerals, and, moreover, is the chief factor in governing the amount of charcoal, carbon, or carbonaceous substance to be added. Now ten per cent. of carbon, if added in the form of charcoal or sawdust, is a very considerable bulk of material compared with the bulk of mineral. Far less would do if it were meant merely to prevent oxidation; but in many cases less would be disadvantageous where the mineral treated has a tendency to melt together on heating. Again, carbon has a most important bearing in its use with partially-oxidized ores, especially those containing antimony.

Antimony oxid once formed is non-volatile. If antimony sulfid and antimony oxid were alone heated together, a portion of the antimony sulfid would volatilize, while a portion would be held back by the oxid as non-volatile antimony oxysulfid or "antimony glass." Carbon prevents this by reducing the non-volatile oxid to volatile antimony metal and carbonic-oxid gas, and thus permits oxidized ores to be handled where otherwise impossible of successful volatilization treatment either in open calcination or muffles.

The extent to which the arsenical and antimonial ores are oxidized, governs to a small extent only the amount of carbon to be added, and practically may be ignored, as the amount of carbon added to prevent melting and running together of the ore will always be greatly in excess of that which could possibly be taken up by deoxidizing.

Ores of the character to which this invention relates are more or less oxidized when they have lain for a long period of time at or sufficiently near the surface and have so been exposed to the action of the atmosphere.

The volatilized sulfurets of arsenic and antimony are much more readily condensed when evolved as more or less concentrated vapors from a closed muffle (or retort) than are the same metallic vapors, either as oxids or sulfurets or metal, if evolved in a gaseous current with other gases, either oxidizing (such as air) or inert, (such as carbonic oxid or carbonic acid.) This readiness of condensation is very material, as the condensed sulfurets command a high commercial value. Means must be taken to prevent the inlet of air into the condensers—as, for instance, by the common expedient of having the end of the outlet-pipe submerged in water.

The product which leaves the furnace after the operation is finished retains its pulverulent condition, not having become agglomerated.

Antimonious-sulfid vapor being very heavy it is advisable to provide the exit-apertures to the muffle-furnace as low as convenient or practicable and to avoid any upward direction of the exit-pipes connected therewith until condensation of the antimonious-sulfid vapors has taken place therein. The condensed antimonious sulfid may here be collected in the molten state and tapped into molds by suitable vents placed at a dip in the condenser-pipe.

The following is given as an example of the driving off of antimony as antimonious-sulfid vapor from a mixed ore: Finely-crushed antimonial pyrites mixed with ten per cent. of sawdust heated for about one hour in a muffle-furnace at from 900° to 1,000° centigrade and the whole of the antimony sulfid was volatilized direct. On taking the hot material out of the muffle and simply rabbling in contact with air all the gold was subsequently found to be extractable by cyanid.

It is evident that the carbon employed might be replaced by other organic matters—as, for instance, sawdust—capable of yielding carbon by calcination.

Finally in carrying out the invention the finely-pulverized ore and carbon may advantageously be briqueted or made up into blocks or bricks with a certain small proportion of a carbonaceous binding material prior to the introduction of the charge into the muffle, using such a substance as shall form a light carbonaceous skeleton through the briquets by the charring thereof during the first stages of heating. Such materials may be tar, pitch, or molasses added in small percentages to the mass during mixing, the briquets being molded by hand or machinery and allowed to solidify sufficiently before charging into the muffle. The advantages gained by such briqueting are, first, greater uniformity of charge; second, the more economical application of the muffle-heat by the avoidance of a thick "dead" non-conducting layer of powdery material over the muffle-bottom; third, far easier escape for the volatilized sulfuret vapors through the large interstices between the briquets; fourth, the utilization of interior muffle-space to a far larger extent than would be possible if merely powdered material were employed; fifth, the presentation of carbon formed during charring to every particle of the ore mass, and, sixth, the fixation of the non-volatile portion of the ore and prevention of mechanical loss therefrom during the escape of volatile material.

The accompanying drawing shows somewhat diagrammatically in longitudinal section apparatus that may be employed in the practice of this invention.

A is a retort heated by flues B, which surround it.

C is a vapor-outlet leading into a condensing-chamber D. E is a second condensing-chamber, of which there may be one or more.

F is a water-seal chamber containing lime-water.

G is an outlet from chamber F.

In the operation of this process carbon or organic material yielding carbon by calcination may be employed, and by the term "carbonaceous material" employed in the claims I intend to include the use in the operation of the process of either carbon or organic material yielding carbon on calcination.

Having now particularly described and ascertained the nature of my said invention and in what manner the same is to be performed, I declare that what I claim is—

1. A process for the removal of antimony and tellurium from sulfurous ores containing also arsenic, by direct volatilization, such process consisting in admixing the ore in a powdered state with powdered carbonaceous material, heating the mixture while protected from the atmosphere to a temperature sufficient to volatilize such arsenic as may be present as arsenious and arsenic sulfid, and further heating to a higher temperature to volatilize the antimony as antimonious sulfid and also drive off the tellurium, but not to a temperature sufficient to effect a substantial reduction of such remaining sulfids as may be present.

2. The process of treating sulfurous ores containing arsenic and one or more other metals requiring higher temperature for volatilization, to separate such components from the ore, which process consists in heating a mixture of the pulverized ore and pulverized carbonaceous material in a retort or muffle furnace sufficiently to volatilize the arsenic sulfid, collecting such vapor in a condenser, further heating the mixture to a higher temperature to volatilize the remaining said component or components and collecting in a condenser the vapor thereof.

3. The process of treating sulfurous ores containing arsenic and one or more other metals requiring higher temperature for volatilization, which process consists in making up the ore when pulverized and admixed with carbonaceous material into blocks or bricks, and then heating said blocks or bricks in a retort or muffle, substantially as described, to separate the arsenic by volatilization, and further heating to a higher temperature to separate the other said component or components from the ore, but not to such temperature as to produce substantial reduction of such remaining sulfids as may be present.

4. The process of treating sulfurous ores containing arsenic and one or more other metals requiring higher temperatures for volatilization, to separate such components from the ore, which process consists in making up the ore when pulverized and admixed with carbonaceous material into blocks or bricks, then heating such blocks to volatilize the arsenic sulfid, and further heating the blocks to a higher temperature to volatilize the other said component or components, substantially as described, but not to such temperature as to produce a substantial reduction of such remaining sulfids as may be present.

5. The process of treating sulfurous ores containing arsenic and one or more other metals requiring higher temperatures for volatilization, to separate such components from the ore, which process consists in heating the ore, when pulverized and mixed with pulverized carbonaceous material, in a retort or muffle furnace to volatilize or drive off the arsenic sulfid, and then further heating the mixture to a higher temperature to volatilize or drive off the remaining said component or components, but not to such temperature as to effect a substantial reduction of such remaining sulfids as may be present.

ELIAS PETERSSON.

Witnesses:
R. B. RANSFORD,
JOHN H. WHITEHEAD.